United States Patent
Parikka et al.

(10) Patent No.: US 7,712,942 B2
(45) Date of Patent: *May 11, 2010

(54) BACKLIGHTING LIGHT PIPE FOR ILLUMINATING A FLAT-PANEL DISPLAY

(75) Inventors: Marko Parikka, Halikko (FI); Markku Kuittinen, Joensuu (FI); Jari Turunen, Onttola (FI)

(73) Assignee: Nokia Corporation, Espoo (FI)

( * ) Notice: Subject to any disclaimer, the term of this patent is extended or adjusted under 35 U.S.C. 154(b) by 208 days.

This patent is subject to a terminal disclaimer.

(21) Appl. No.: 11/404,976

(22) Filed: Apr. 14, 2006

(65) Prior Publication Data

US 2006/0187677 A1    Aug. 24, 2006

Related U.S. Application Data

(62) Division of application No. 09/473,765, filed on Dec. 29, 1999, now Pat. No. 7,114,820.

(30) Foreign Application Priority Data

Dec. 30, 1998    (FI) .................................... 982825

(51) Int. Cl.
*F21V 7/04*    (2006.01)
(52) U.S. Cl. ................... 362/606; 362/617; 362/619
(58) Field of Classification Search ............... 362/607, 362/617–619, 318, 26, 330, 339, 561, 555, 362/19, 606; 359/572, 573, 565, 567, 569; 349/63–67
See application file for complete search history.

(56) References Cited

U.S. PATENT DOCUMENTS

| | | | |
|---|---|---|---|
| 4,672,187 A | 6/1987 | Fujita et al. ............... 250/201 |
| 5,032,003 A | 7/1991 | Antes ........................ 350/162 |
| 5,315,676 A * | 5/1994 | Sunagawa ................... 385/37 |
| 5,513,025 A | 4/1996 | Watanabe et al. ............ 359/68 |
| 5,575,549 A | 11/1996 | Ishikawa et al. ............ 362/31 |
| 5,584,556 A | 12/1996 | Yokoyama et al. ........... 362/31 |
| 5,640,483 A | 6/1997 | Lin ............................ 385/146 |
| 5,703,667 A | 12/1997 | Ochiai ........................ 349/65 |
| 5,718,497 A | 2/1998 | Yokoyama et al. ........... 362/31 |
| 5,742,433 A | 4/1998 | Shiono et al. ............... 359/575 |
| 5,748,828 A | 5/1998 | Steiner et al. ............... 385/146 |
| 5,775,791 A | 7/1998 | Yoshikawa et al. ........... 362/31 |

(Continued)

FOREIGN PATENT DOCUMENTS

DE    35 36 497 A    12/1985

(Continued)

OTHER PUBLICATIONS

Shogo Ura, Focusing Grating Integrated Optical-Disk Pickup Device, Electronics and Communications in Japan, Oct. 1985, pp. 803-811, vol. 68-C, No. 10, Scripta Technica, Inc. JP.

(Continued)

*Primary Examiner*—Thomas M Sember

(57)    ABSTRACT

A light pipe includes a light input end and a diffractive structure. The diffractive structure includes elongated formations having diffractive properties for coupling light out from the light pipe to provide backlighting of a flat-panel display. The elongated formations are curved, the curvature being dependent on the location of a light source at the light input end.

18 Claims, 11 Drawing Sheets

U.S. PATENT DOCUMENTS

| | | | | |
|---|---|---|---|---|
| 5,779,338 | A | 7/1998 | Ishikawa et al. | 362/31 |
| 5,801,795 | A | 9/1998 | Ogino | |
| 6,011,602 | A | 1/2000 | Miyashita et al. | 362/31 |
| 6,036,327 | A | 3/2000 | Blonder | 362/31 |
| 6,174,064 | B1 | 1/2001 | Kalantar | 362/31 |
| 6,196,691 | B1 | 3/2001 | Ochiai | 362/31 |

FOREIGN PATENT DOCUMENTS

| | | |
|---|---|---|
| EP | 584546 | 3/1994 |
| EP | 0733928 | 9/1996 |
| EP | 0760490 A3 | 3/1997 |
| EP | 0781959 A1 | 7/1997 |
| EP | 0 881426 A1 | 10/1997 |
| EP | 0821293 | 1/1998 |
| EP | 0 881426 A1 | 2/1998 |
| JP | 61-35585 | 2/1986 |
| JP | 9127894 | 5/1997 |
| WO | WO 94/24589 | 10/1994 |
| WO | WO 97/26584 | 1/1997 |
| WO | WO 97/32243 A1 | 9/1997 |
| WO | WO 97/41471 | 11/1997 |
| WO | WO 98/26212 | 6/1998 |
| WO | WO 98/55798 | 12/1998 |

OTHER PUBLICATIONS

"Micro-Optics: Elements, Systems and Applications" pp. 31-52, Chapter II entitled "Diffraction Theory of Microrelief Gratings", J. Turunrn, 1997.

"Illumination Light Pipe Using Micro-Optics As Diffuser", Proceeding Europto series, Holographic and Diffractive Techniques, SPIE 2951, pp. 146-155, 1996.

Grating Coupuler for Efficent Excitation of Optical Guided Waves in Thin Films, M.L. Dakss et. al Applied Physics Letter, vol. 16, No. 12, Jun. 15, 1970, pp. 523-525.

"Differactive Optics for Industrial and Commercial Application" edited by J. Turunen and F. Wyrowski, Akademie Verlag GbbH, Berlin, Germany, 1997 pp. 22-24, 417-418.

"Digital Diffractive Optics- An Introduction to Planar Diffractive Optics and related Technology" B. Kress and P. Meyrueis, John Wiley & Sons, Lts., West Sussex, England, 2001, 114-115.

"Method for Computer Design of Diffractive Optical Elements", Edited by V. Soifer, John Wiley & Sons, Ltd., New York, NY, 2002, 652-657, 670-671.

MILS-System, Nov. 3, 1999, High Technology Finland 2000.

* cited by examiner

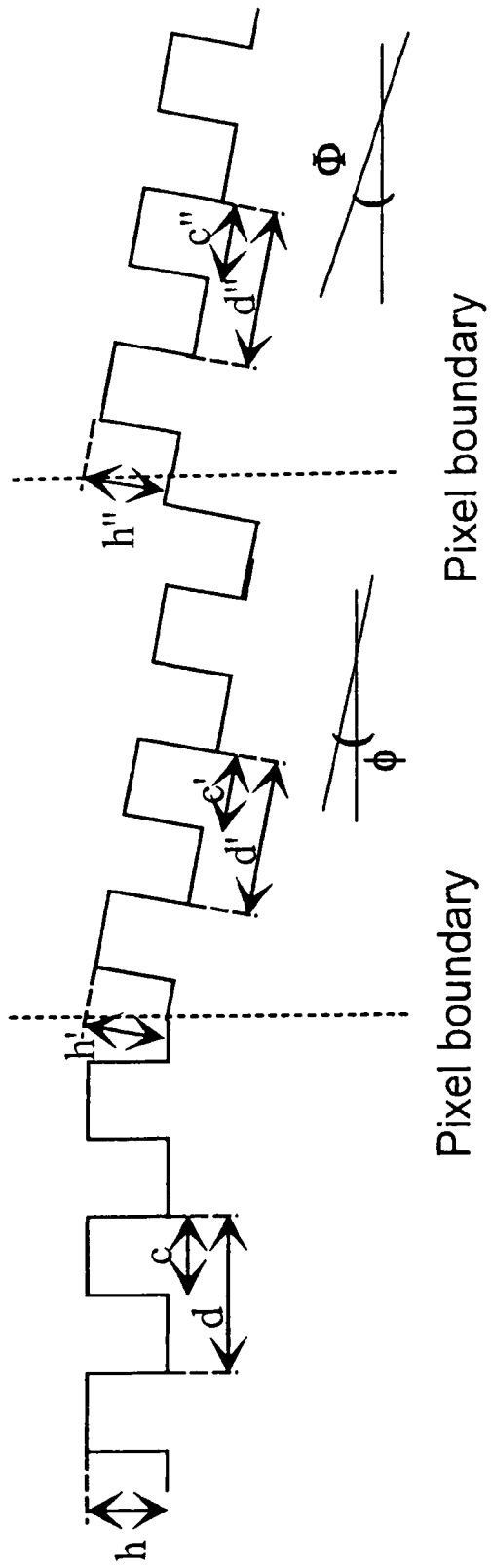
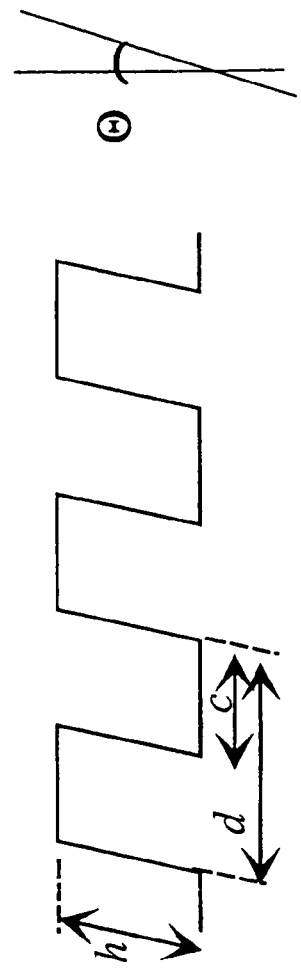
FIGURE 10 A
FIGURE 10 B

BACKLIGHTING LIGHT PIPE FOR ILLUMINATING A FLAT-PANEL DISPLAY This application is a divisional of U.S. application Ser. No. 09/473,765, filed 29 Dec. 1999, now U.S. Pat. No. 7,114,820 which is incorporated by reference herein in its entirety.

The invention relates to uniform backlighting of flat-panel displays by means of a thin light pipe.

BRIEF DESCRIPTION OF RELATED DEVELOPMENTS

Modern electronic devices often have a liquid crystal display to transmit information to the user. In order to make the display readable even in twilight or darkness, the display is generally lit by means of light emitting diodes (LED), but especially in portable devices powered by a battery and/or an accumulator, this also has a shortening effect on the actual operating time of the device. In addition, the requirement for uniform brightness of the display is essential in view of readability, but it increases power consumption to compensate for the loss of light caused by diffuser plates and the like. Instead of using opaque baffles, an alternative is to use a diffractive light pipe structure to conduct the light in the favorable direction, from the light source to the display, whereby there is also more freedom for the disposition of components.

With regard to known techniques related to the art of the invention, reference is made to solutions described in connection with the prior art (FIGS. 1 to 2). A known arrangement is to use 'thick', 'plate-like' light pipes, on one end of which there is a light source, and on one flat side of the plate with the largest area and/or inside the light pipe there is a lighted object for achieving uniform illumination thereof. It is also known that when the light pipe is made thinner, the distribution of the illumination of the display may become less advantageous. However, there is very little extra room in modern mobile stations and other equipment provided with a display, and thick light pipe structures cannot be used in them without a negative effect on the usability of the device. Thick elements also mean increased material costs to the manufacturer and thereby more pressure on pricing.

There are also known techniques with a thin, plate-like light pipe, from one end of which a light source emits light to the space between the upper and lower surfaces of the light pipe. The bottom of the light pipe may be randomly roughened, e.g. the lower surface of a plate-like light pipe, when the display or a corresponding object to be illuminated is positioned above the upper surface of the light pipe, in the direction of the viewer. The purpose of the roughening is to distribute the light to scatter as uniformly as possible in the direction of the display. There may also be a diffuser, a reflector or a corresponding extra layer under the roughened surface to direct the light that has passed through the roughening back to the light pipe, through it and from it in the direction of the display to increase its illumination.

Although it is the total reflection principle that the propagating light obeys on its way through the light pipe, the random roughening on the light pipe surface may cause problems to the homogeneity of the light, especially at the opposite end to the light source. In other words, much less light comes to the other end of the display than left the first end of the light pipe at the light source. Increasing the number of light sources as well as increasing their power, combined with the use of diffuser plates between the light pipe and the display and/or the light source and the light pipe improve the uniformity of illumination, but also increase power consumption and space requirements.

FIG. 1A illustrates the lighting arrangement of display 1 by using a thin, flat light pipe 3, the lower surface 4 of which is randomly roughened. FIG. 1B represents the local efficiency of the light source, by which light produced by the light source can be converted to backlighting (outcoupling efficiency $\eta$ hereinafter). The local outcoupling efficiency is represented as a function of location, the coordinate measured from the source end of the light pipe. Because the outcoupling efficiency itself is constant all the way, the brightness of the display as seen by an outside observer is according to FIG. 1C, which thus represents the local brightness of a slice of the display as a function of the distance measured from the end at the light source. FIG. 1D shows in principle how individual rays 5 and 6 leaving a light source L1 propagate in a light pipe 3 and are converted into background light at points 5A to 5E, 6A and 6B.

Another technique for evening out the inhomogeneous brightness, which changes as a function of location as shown in FIG. 1C, is to change the local outcoupling efficiency $\eta$ as a function of distance by placing dots at which the light is scattered or reflected on the top or bottom of the light pipe. The dots are, for instance, small lenses, which are located at long intermediate distances in the first end of the light source and at shorter intermediate distances in the other end so that there is a smaller difference in brightness B between the first and second end of the display. FIG. 2 illustrates a known arrangement like that described above for illuminating a flat-panel display 7 with a light pipe 9, in which arrangement the lower surface of the light pipe 9 is covered with lenses. The amount of light 8 is greater in the first end of the light pipe 9 near the light source L2 than in the second, opposite end. Because the purpose is to illuminate the display more uniformly, and the local outcoupling efficiency $\eta$ of the light depends on the local number of scattering and/or reflecting lenses, it is advantageous to make the density of the optical elements smaller near the light source than far from it. To improve the lighting still more, a reflector 10 can be used to return unfavorably directed light back to the direction of the display 7.

Estimating the transmission properties of the light pipe either by experimental or calculatory methods by using known techniques is practically impossible because of the great number of prototypes needed and the number and small size of the lenses, whereby obtaining an acceptable, optimal result with the known technique is questionable.

SUMMARY OF THE EXEMPLARY EMBODIMENTS

It is an objective of the invention to provide a new light pipe, which provides uniform illumination of the background of the display and which is easy to manufacture.

In accordance with an embodiment, a light pipe is provided. The light pipe comprises a light input end and a diffractive structure including elongated curved formations having diffractive properties for coupling light out from the light pipe to provide backlighting of a flat-panel display. The curvature is dependent on the location of a light source at the light input end.

In accordance with another embodiment, a display arrangement is provided. The display arrangement comprises at least one light source, a flat panel display and a light pipe. The light pipe comprises a light input end and a diffractive structure including elongated curved formations having diffractive properties for coupling light out from the light pipe to provide backlighting. The curvature of the diffractive structure is dependent on the location of a light source at the light input end.

In accordance with yet another embodiment, a method for providing backlighting of a flat-panel display is provided. The method comprises inputting light at an input end of a light pipe into a diffractive structure of the light pipe provided with diffractive properties and coupling light out from curved elongated formations of the diffractive structure, the curvature of the elongated formations being dependent on the location of a light source at the light input end.

Preferred more specific embodiments are defined in dependent claims.

For producing the backlighting of a flat-panel display, a patterned light pipe may be used in the embodiments, in which light pipe at least one surface has been treated to achieve diffraction properties, by which the local outcoupling efficiency of the light pipe can be changed as a function of the distance and/or wavelength measured from the light source. The outcoupling efficiency of the light pipe depends on at least one parameter, which describes the diffraction properties of the surface. The local outcoupling efficiency is influenced by quantities characterizing the diffractive surface, such as the periodicity of the surface formations of the patterns of the diffraction profile, the period d, the fill factor c and/or the height/depth of the ridges/grooves of the profile. Surface formations that are suitable as basic diffraction profiles according to an embodiment of the invention include binary, rectangular wave, sinusoidal, and/or triangular wave, and by forming suitable combinations thereof the properties of the invention can be optimized for each application.

In addition, according to an embodiment of the invention, the properties of a diffractive light pipe can be improved by dividing its surface to form pixels, in which its gridded properties are locally uniform. Especially at the end at the light source, the orientation of the pixels can be used advantageously to improve the distribution of the light and thus the brightness of the backlighting of the display. The patterns on the light pipe surface can be, for instance, of two types of diffractive pixels, which are both of the binary type. Some of the pixels in the vicinity of the light source are oriented so that the diffraction profiles, and thus the pixels themselves are at 90° rotational geometry to each other, when the imaginary axis of rotation is parallel with the normal of the surface of the light pipe. In addition, modified basic profiles or combinations thereof can be used.

BRIEF DESCRIPTION OF THE DRAWINGS

The invention will be described in detail with reference to the following drawings, in which FIG. 10 represents a modified profile and/or pixel structure of a light pipe according to an embodiment of the invention.

DETAILED DESCRIPTION OF THE EXEMPLARY EMBODIMENTS

Figure 1A:
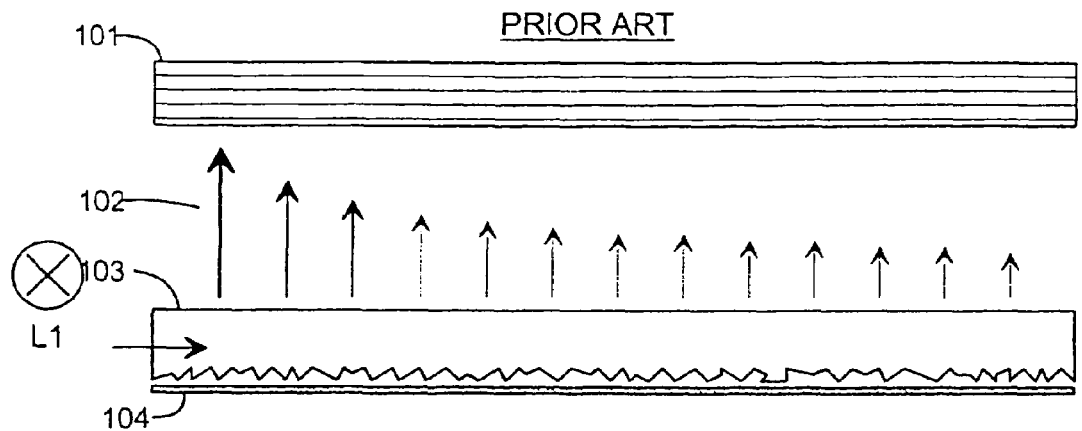
FIG. 1 shows a known arrangement based on random roughening in order to provide lighting.
Figure 1B:
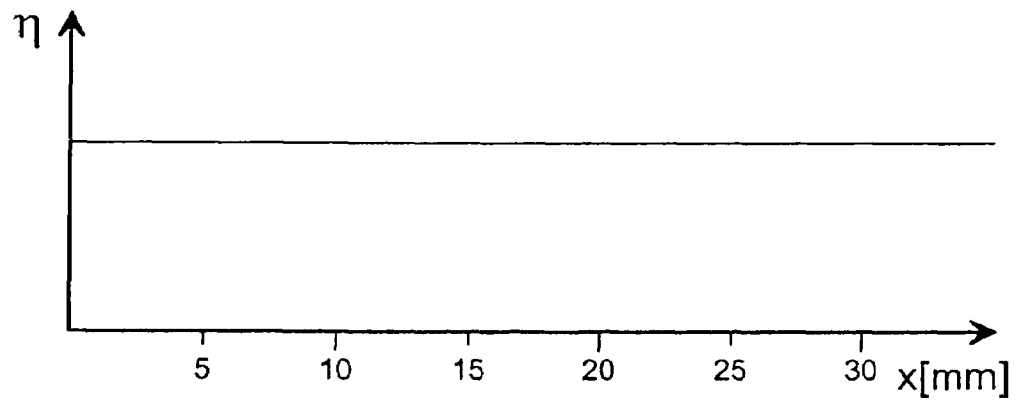
Figure 1C:
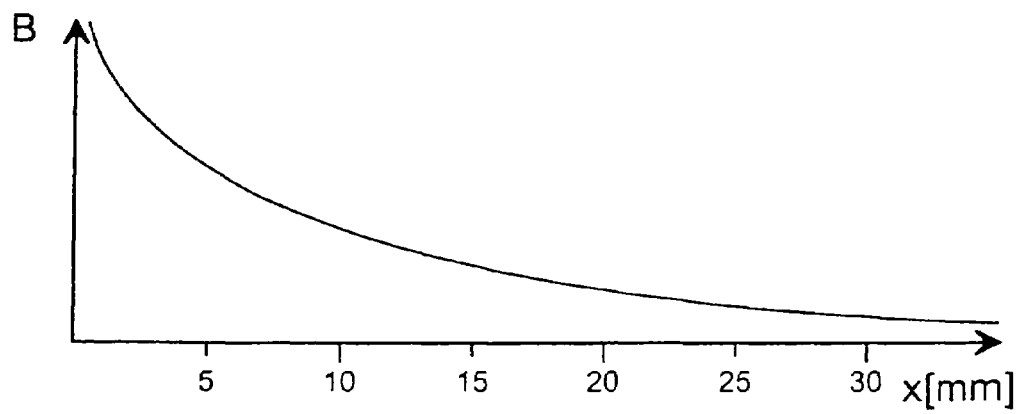
Figure 1D:
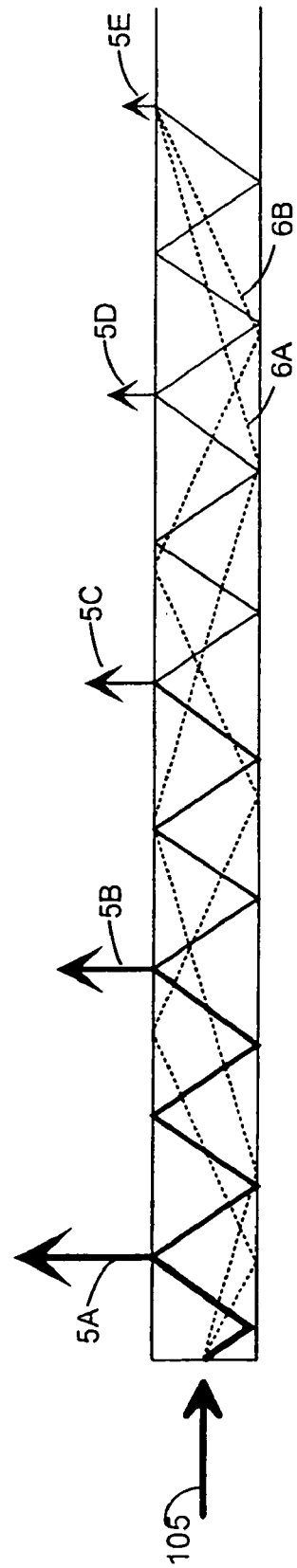
Figure 2:
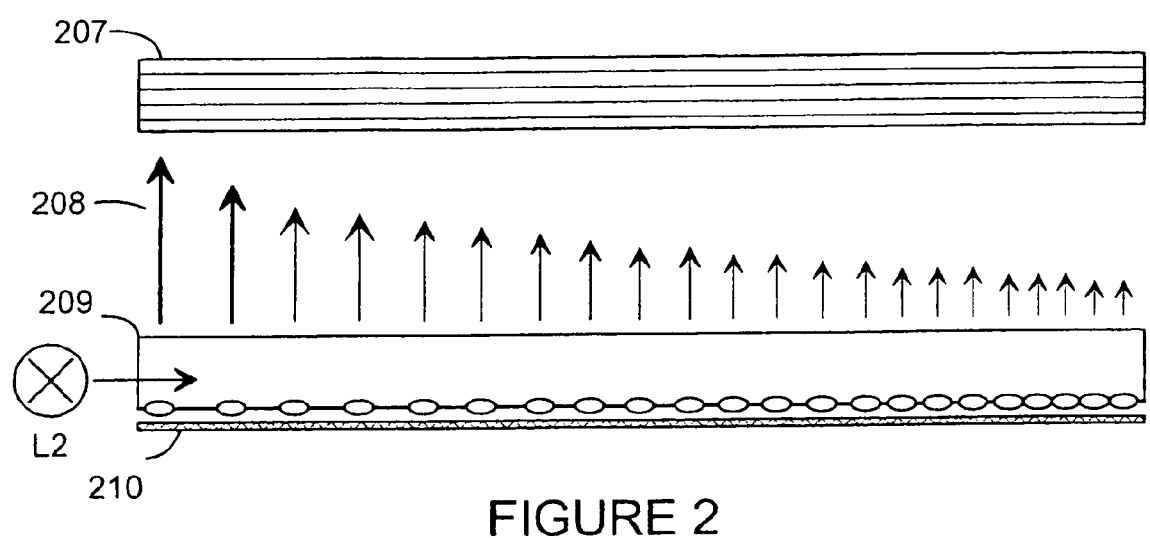
FIG. 2 shows a known arrangement, which is based on the use of lens-like scatterers instead of random roughening for directing the light to the object.

FIGS. 1 and 2 represent methods formerly known from prior art for backlighting.

FIGS. 1A, 2, 3A, 5A, 7, 9A, 9B, 10A represent the principles of the patterns of the microstructure of the diffraction profile geometry, and are thus not necessarily in the right scale in relation to the macroscopic dimensions or thickness of the light pipe.

Figure 3A:
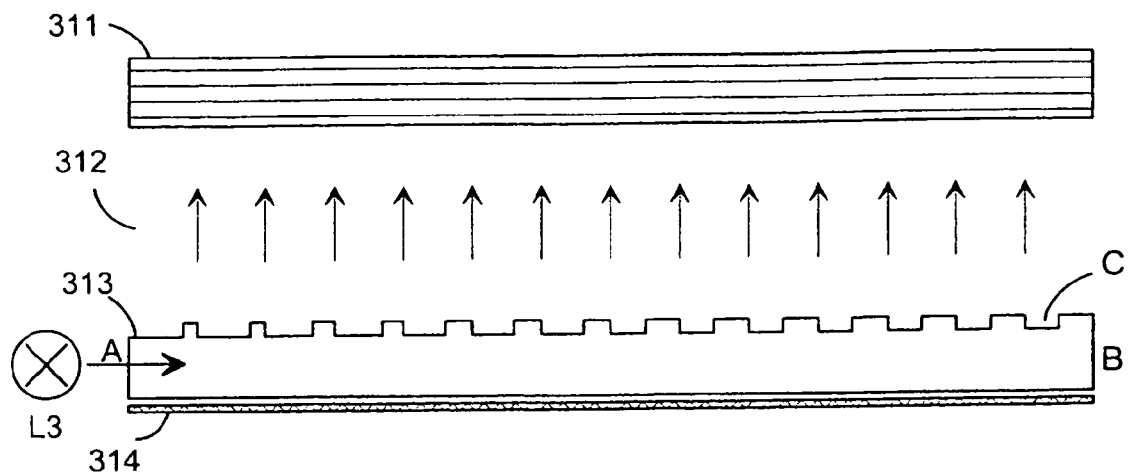
FIG. 3 shows a light pipe arrangement according to an embodiment of the invention.

FIG. 3A shows how the illumination of a flat-panel display 301 can be arranged by means of a light pipe 303 according to a preferred embodiment of the invention. The light pipe 303 has a binarized diffraction surface, in which the geometrical properties of the surface profile change when the distance from the light source increases. Locally, the geometrical changes are small as compared to the adjacent formations, and they approximate at a certain accuracy a grid structure, in which the grid constant changes as a function of location. The light 302 is equally strong throughout the whole diffractive light pipe element 303, although individual rays of light 302 are stronger at the first end 303A of the light pipe 303 close to the light source L3 than at the opposite end 303B. The local outcoupling efficiency η of the diffraction element 303C has been changed by utilizing its dependence on the fill factor c. In addition, it is advantageous for the invention to use, for instance, a Lambertian white reflector 304 below the light pipe 303 to reflect or scatter the part of the light which has passed through the bottom of the light pipe 303 in the wrong direction back to the light pipe 303 to be used for the illumination of the display 301.

Figure 3B:
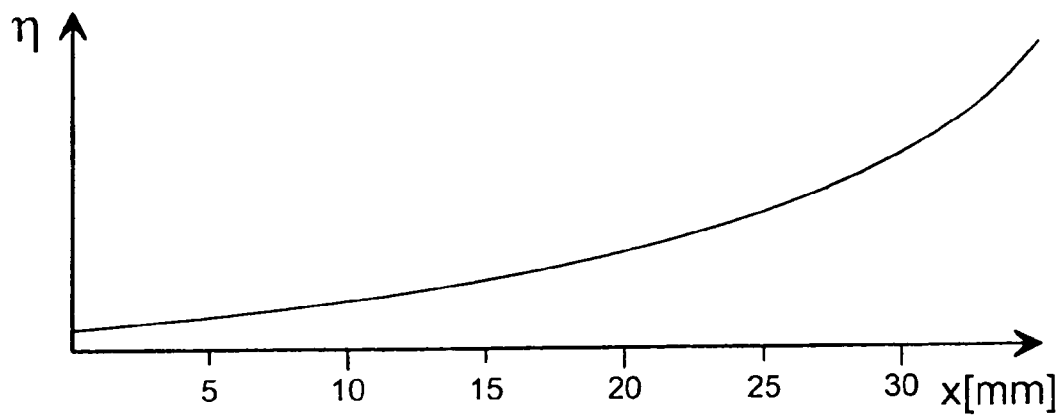

FIG. 3B represents the local outcoupling efficiency η of the diffractive construction according to a preferred embodiment of the invention as the function of a location measured from the light source L3.

Figure 3C:
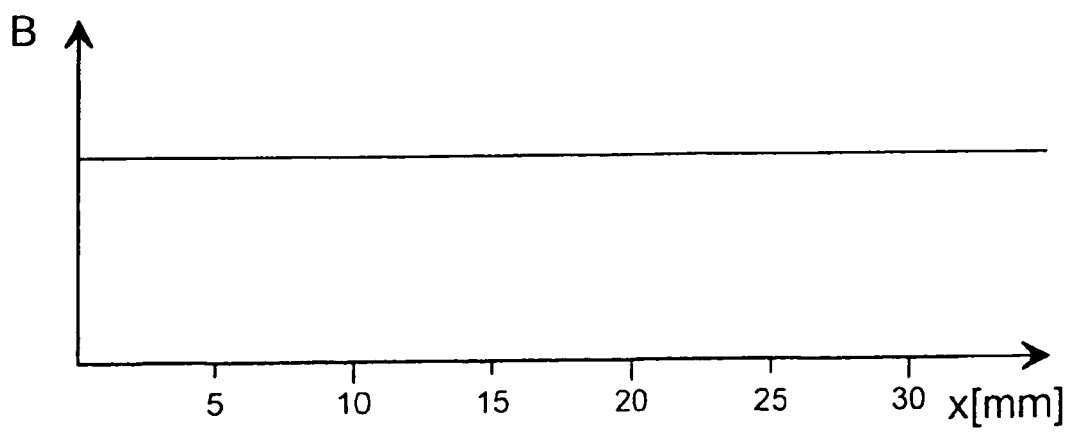

FIG. 3C represents the local brightness B of the display achieved by a diffractive structure according to a preferred embodiment of the invention as the function of a location measured from the light source L3, when the outcoupling efficiency of FIG. 3B has been compensated for achieving a constant brightness by changing the geometry of the diffractive profile, e.g. the fill factor. Brightness is constant, and thus independent of location.

The length 30 mm of the horizontal axis in FIGS. 3B and 3C is only an example, and the length and/or width of a real display as well as other dimensions of the light pipe can differ from this substantially.

Figure 3D:
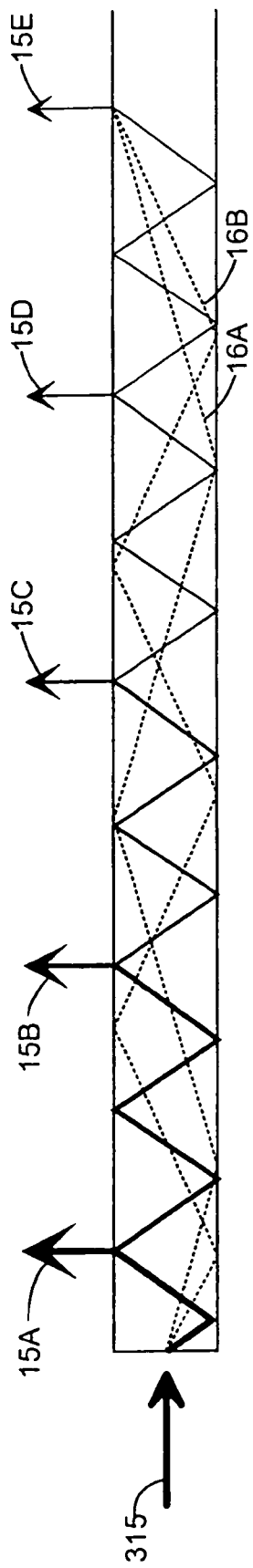

FIG. 3D illustrates the passage in the light pipe 313 of the rays 315, 16A and 16B of light, which have left the light source L3, and their conversion into rays 15A to 15E, which are transmitted out from the light pipe. Note that in the transmissions and reflections taking place at points 15A to 15E, the macroscopic brightness of the light equals that in FIG. 3C outside the light pipe as seen by an observer in the direction of the display, although with regard to an individual ray of light, in a microscopic scale, the intensity of the ray of light is reduced as the function of a distance measured from the light source, also in consequence of multiple reflections and/or transmissions. Uniform brightness is achieved by directing a larger part of the locally available light out from the light source by means of a diffractive structure according to a preferred embodiment of the invention (FIG. 3A).

Figure 4:
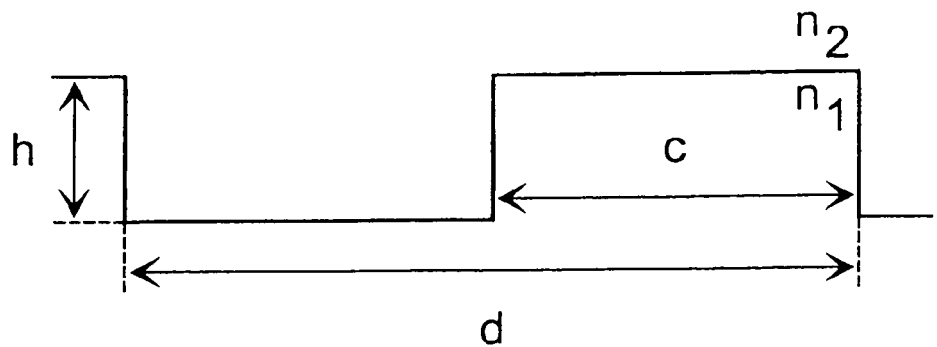
FIG. 4 shows a detail of a light pipe according to an embodiment of the invention.

FIG. 4 illustrates the structure of the surface geometry of a diffractive light pipe in one of the preferred embodiments of the invention. Characteristic parameters of a binary diffraction profile are cycle length d, fill factor c and ridge height h of the profile. n1 is the refractive index of the light pipe material, and n2 is the refractive index of the medium between the light pipe and the display.

Figure 5A:
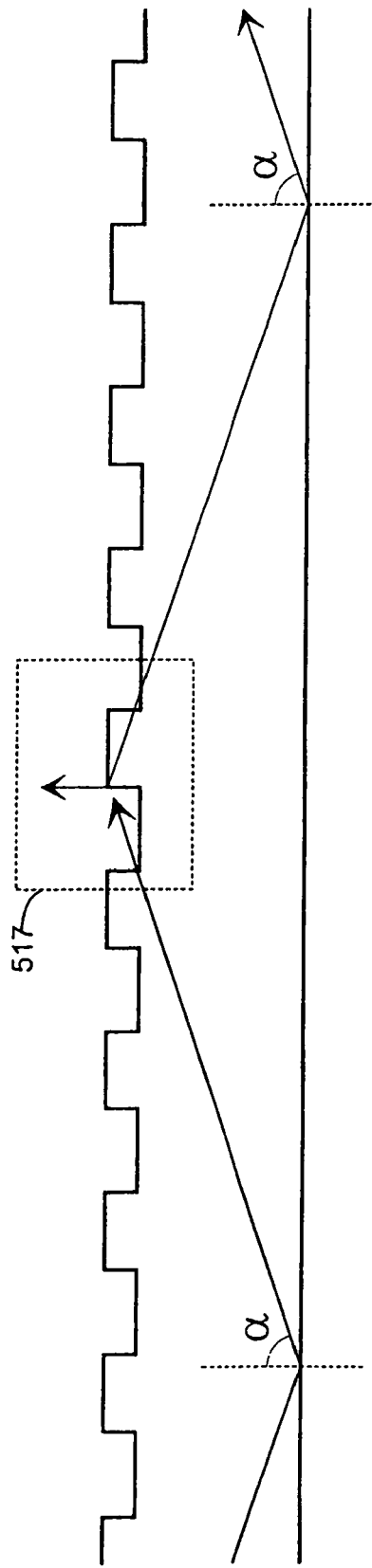
FIG. 5 shows the diffraction and reflection taking place in a light pipe according to an embodiment of the invention.

FIG. 5A illustrates the propagation of light with the principle of total reflection in a diffractive light pipe according to the invention, in view of a ray of light, which passes in the direction $\alpha$ in relation to the normal of the inner surface of the light pipe. A detail 517, which illustrates the passage of the ray of light at one period of the diffractive structure, is delimited by a dashed line from the light pipe.

Figure 5B:
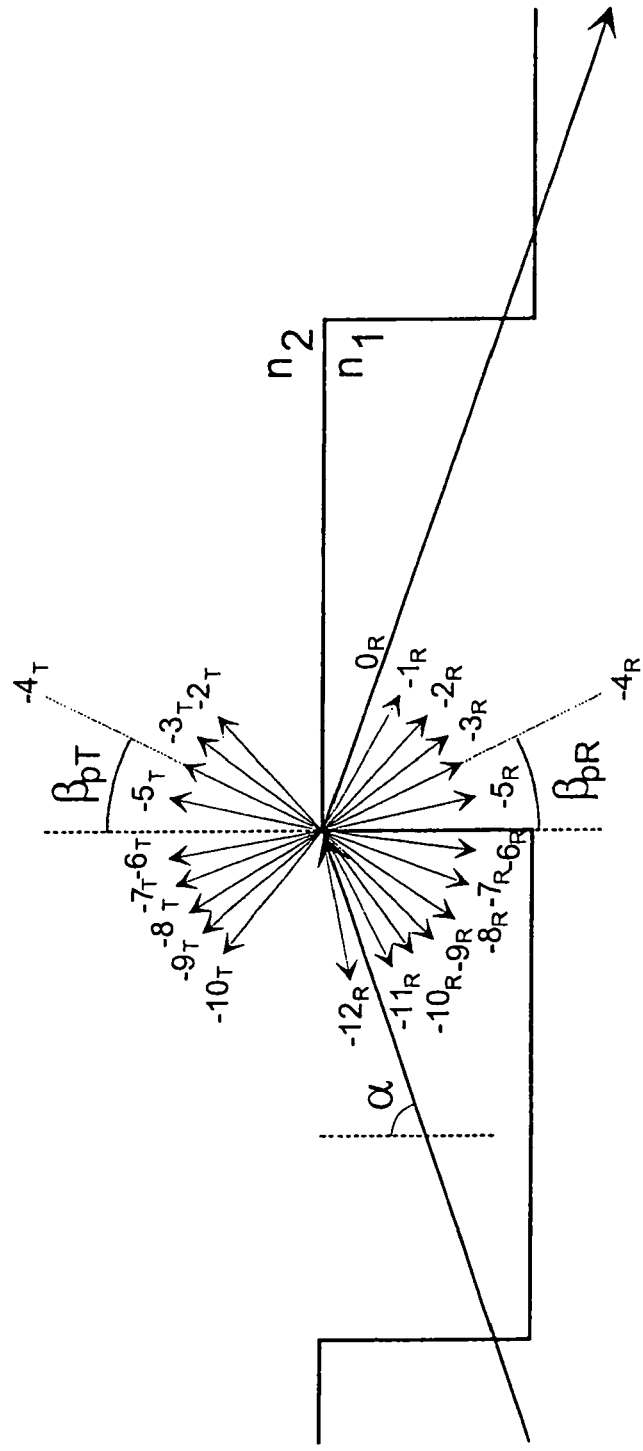

FIG. 5B is an enlargement of the detail 517 in FIG. 5A. The optical geometry is the same as in FIG. 5A. When a ray of light hits the diffractive profile d, its diffraction is represented by angles of transmission and reflection, $\beta_{pT}$ and $\beta_{pR}$, respectively, certain orders of which are marked in FIG. 5B. For instance, $0_R$ is the ordinary reflection of the principal ray.

Figure 6:
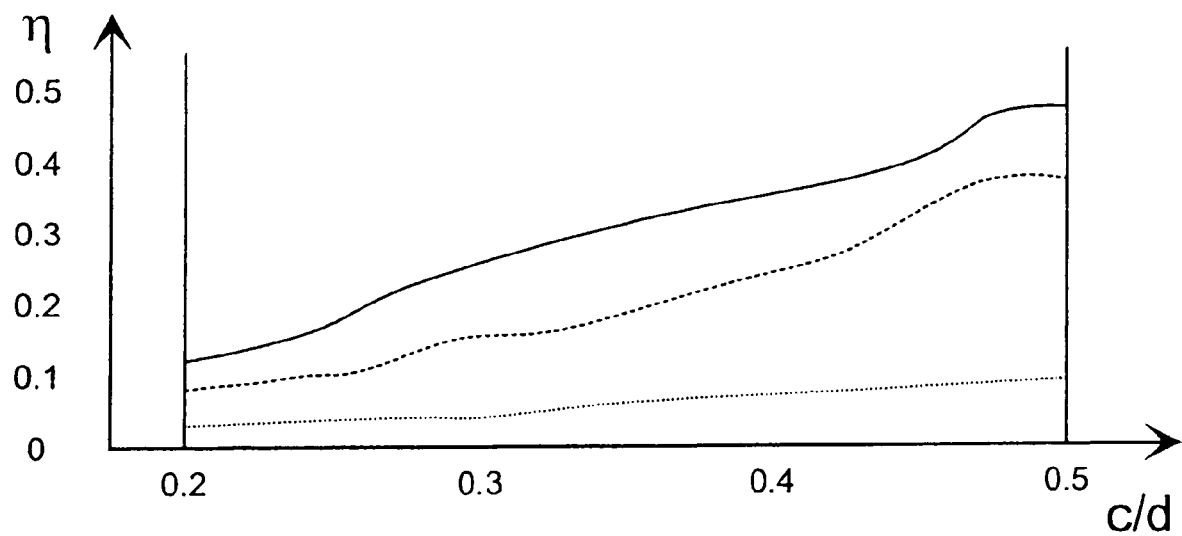
FIG. 6 represents the local outcoupling efficiency η of the diffractive structure as a function of the distance measured from the light source, FIG. 7 show a light pipe according to a preferred embodiment of the invention.

FIG. 6 shows the outcoupling efficiency $\eta$ of the diffractive surface as the function of the fill factor c standardized with the period d, in other words, the dependence of the outcoupling efficiency as the function of the ratio c/d. The dependence is represented for three angles of incidence of the principal ray: 60° (continuous line), 70° (dashed line) and 80° (dotted line). The results shown in the figure are based on calculated mean values of the transverse electric and magnetic fields of the propagating light. Rays of light, which are directly transmitted or advantageously reflected have been taken into account. The absorption of the white reflector plate on the bottom of the light pipe has not been taken into account in the calculation.

Figure 7:
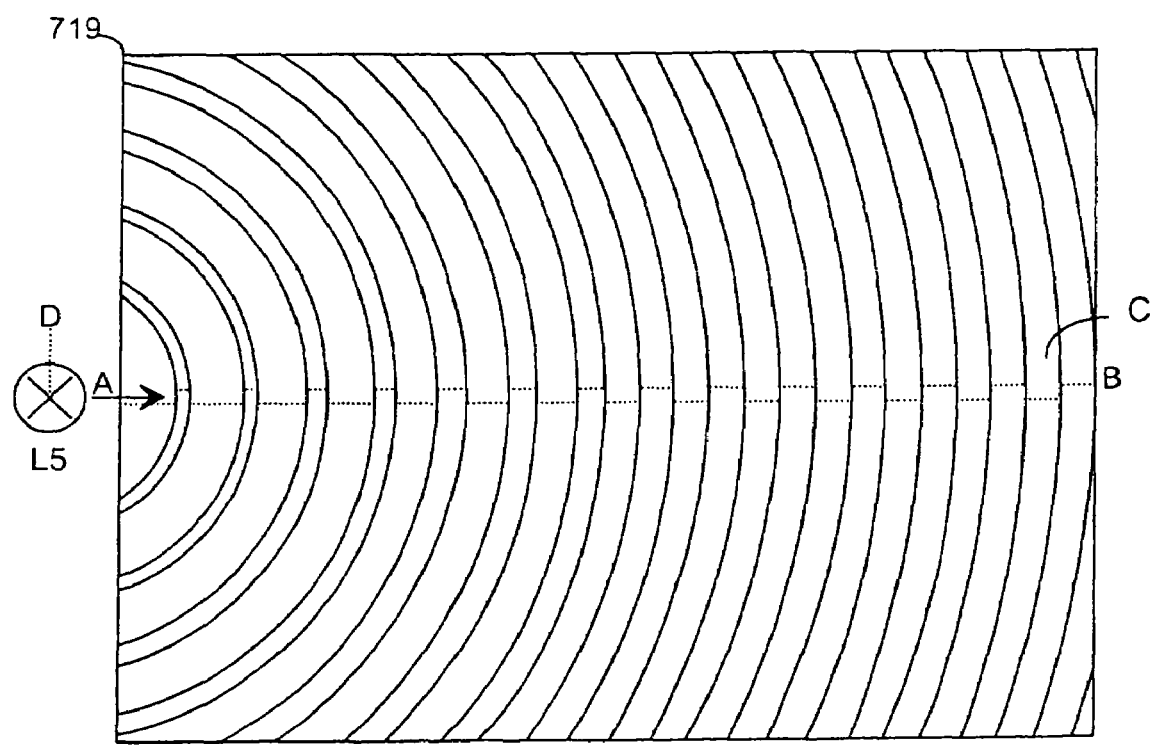
Figure 8A:
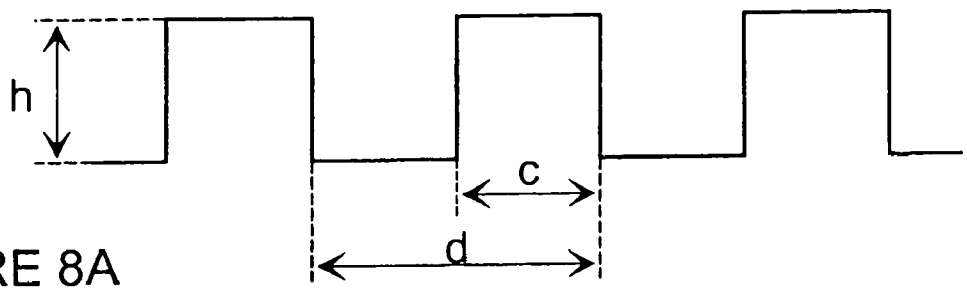
FIG. 8 illustrates the basic profiles of the grooves and ridges of the diffractive structure of a light pipe according to some embodiments of the invention.
Figure 8B:
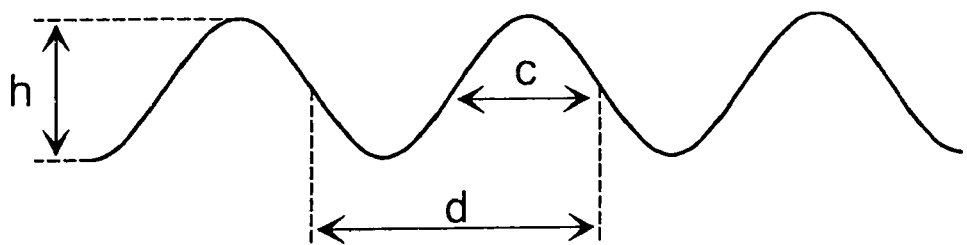
Figure 8C:
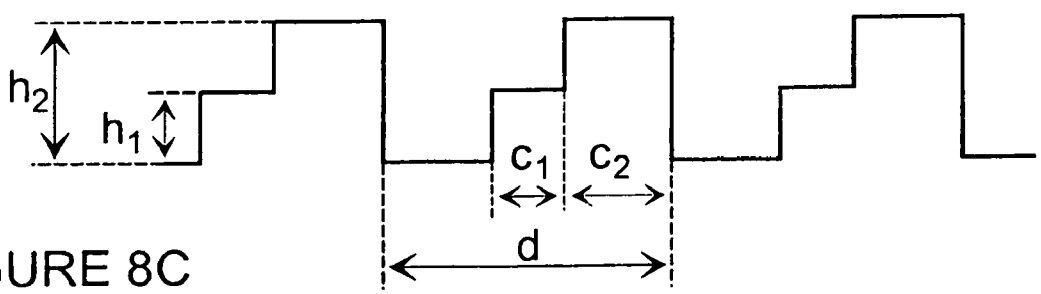
Figure 8D:
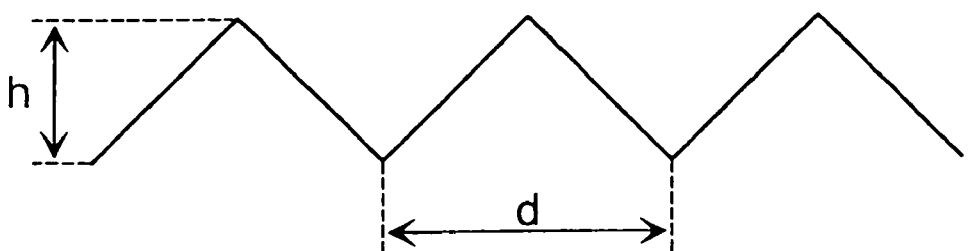

FIG. 7 shows, by way of example, preferable embodiments of the invention achieved by using a binary profile of the light pipe (FIG. 8). FIG. 7 shows the principle of a light pipe section 719 made by curved grooving. A dotted line A-B shows the places of the grooves C and ridges of the diffraction profile and the geometric principle as a viewer would see them when looking from the side of the diffraction element 719 (bottom or top edge in the figure) on the level of the surface of the light pipe, perpendicular to the propagation direction of the light. Other diffraction profiles (FIGS. 8 and 10) are also possible in a light pipe section 719 either as such or by combination.

FIG. 8 illustrates alternative diffraction profiles for the surface formation of a light pipe (and pixels contained in it) according to a preferred embodiment of the invention, and related parameters, which influence the optical properties of the surface. FIG. 8A shows a binary groove/ridge profile for a diffraction surface and/or its pixels. In the figure, h is the height of the ridges, c is the fill factor and d is the length of the groove/ridge period of the profile. FIG. 8B shows a sinusoidal profile, in which h is the height of the ridge, d is the length of the period and c is the fill factor as defined on the basis of the half-wave width of the sinusoidal ridge. As an example of a multilevel diffraction profile structure, FIG. 8C shows a three-level structure with its characteristic parameters: h1 and h2 are the heights of the levels of the grooves of a locally gridded structure, d is the length of the period and c is the fill factor. FIG. 8D shows a detail of a diffractive profile structure provided with triangular ridges, in which the height of the ridge is h, the length of the period d and the fill factor c as defined on the basis of the half-wave width of the ridge as in FIG. 8B. The fill factor can also be varied by changing the apex angle of the triangular ridge. In addition to these, other profiles can also be used. For instance, profiles that are achieved by combining at least two basic profiles shown by FIG. 8 can be used either as such, by combining and/or modifying them and/or combining with them mathematically represented periodical forms, which can be described by means of parameters associated with the basic profiles. An example of this is a diffraction profile, which is obtained from a sinusoidal wave profile (FIG. 8B) by combining with it other sinusoidal profiles, the period lengths and fill factors of which are functions of the mathematical value of the period length and fill factor or phase of the form of a basic profile (e.g. FIGS. 8A to 8D).

Figure 9:
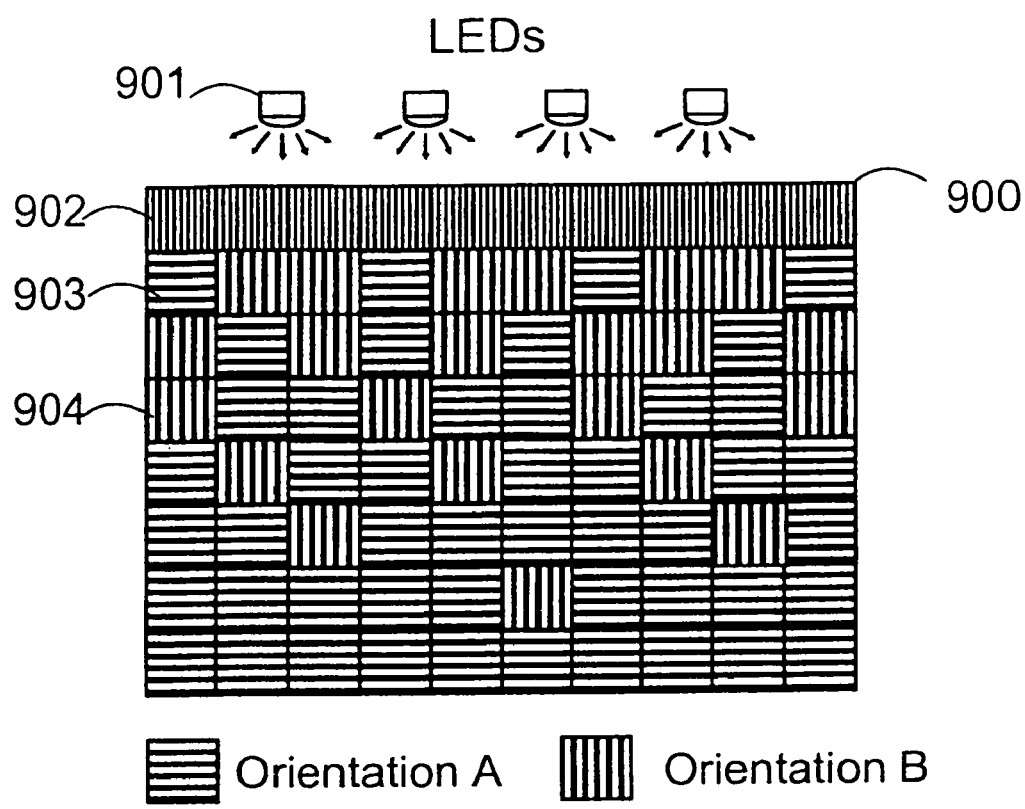
FIG. 9 illustrates a pixelized, diffractive basic structure of a light pipe than can be used in embodiments of the invention.
Figure 9:
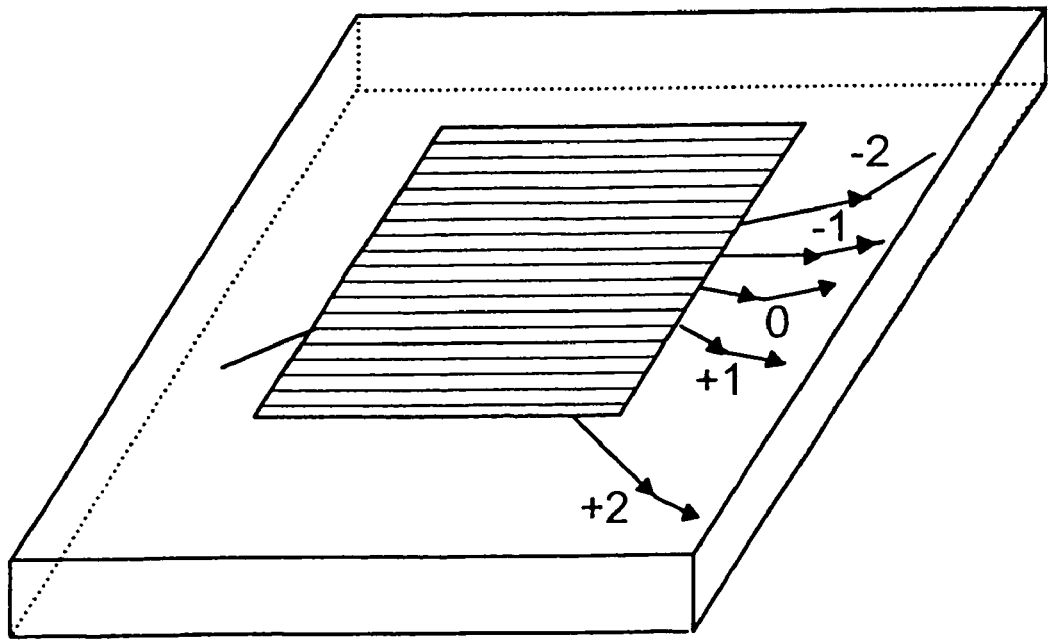

FIG. 9 shows an arrangement in which the diffraction surface of a light pipe consists of pixel-like patterns. The purpose of the pixelization and/or orientation of the pixels is to influence the uniformity of the light at the first end of the light pipe by means of diffraction, and thus to improve the properties of the diffraction surface of the light pipe. The diffractive surface can be divided into pixels so that the pixels closest to the light source form (orientation B) an equalizing portion 902, in which the light of the light source is distributed as a result of diffraction to form a macroscopically uniform lighting. The pixels of such an equalizing portion 902 based on diffraction are preferably positioned according to the orientation B and even in different geometry in relation to the period length and the fill factor or in relation to another degree of freedom, which is essential with regard to the application. The purpose of pixels 903, 904, which are further away in the direction of propagation of the light are either to couple light out from the pipe section in order to produce lighting (pixel 903, orientation A) and/or to distribute the light coming from the light source to make it still more uniform (pixel 904, orientation B). It is advantageous to use more light distributing pixels 902, 904 in the vicinity of the light source 901 than further from it. In this diffraction structure used here as an example, the purposes of the pixels are determined on the basis of their orientation (FIG. 9A).

FIG. 9B shows the propagation of light in a pixel, which equalizes the lighting. As a result of diffraction, the incoming ray of light is distributed in many directions, which are described by means of orders representing intensity maximums. The directions of the diffraction maximums corresponding to the orders ±2, ±1 and 0, which also correspond to the propagation directions of the rays of light, are marked in the figure.

The pixels can be locally homogeneous, and/or the fill factor and period can change within them as the function of a quantity measured from the light source, such as distance. Although the pixelizing is represented here in a rectangular application, it can also be applied in other geometrical shapes, such as the groove patterns shown in FIG. 7, when an uniform backlighting of a display is optimized by the placement of the light source.

FIG. 10 shows modifications of the basic profiles of a diffractive light pipe according to a preferred embodiment of the invention. FIG. 10A represents a profile, which is binary, but can also be derived from the basic forms of FIG. 8, as applied to the pixelization of a diffraction surface according to FIG. 9, for example. Some of the pixels in FIG. 10A are deflected from the level of the surface of the light pipe (horizontal) to the angle $\Phi$, some to the angle $\phi$, and some are parallel with the surface of the light pipe. After the presentation of the FIGS. 10A and 10B, it will naturally be clear to a person skilled in the art that in a pixelization, which is incorporated in the structure of a macroscopic piece, the angles of deflection and the relation of the number of deflected pixels to the number of non-deflected pixels in a light pipe also has an effect on its diffraction properties. FIG. 10B shows a diffraction profile according to a preferred embodiment of the invention as derived from the basic forms of FIG. 8, when the surface formations are deflected to the angle Θ from the level determined by a pixel shown in FIG. 10A. It will also be clear to a person skilled in the art that structures, which are skewed in relation to the peak of the surface formation, are also possible in a diffraction profile. FIG. 10 represents the principles of the geometry of diffraction profiles, and thus the size and/or angles of deflection of the pixels are not necessarily in the right scale to the periods and/or heights of the surface formations.

The theory related to the prior art about the behavior of light in diffraction, about the effect of the parameters of microgeometry, the properties of the light source and its distance has been dealt with, e.g. in the book Micro-optics: Elements, systems and applications, edited by Hans Peter Herzig, Taylor and Francis, 1997, and especially in chapter 2: Diffraction Theory of Microrelief Gratings by Jari Turunen.

There are also other publications related to the prior art, such as Illumination light pipe using micro-optics as diffuser, Proceedings Europto series, Holographic and Diffractive Techniques, SPIE 2951, 146-155. 1996.

A diffraction phenomenon is observed in monochromatic light when the light meets a piece or a group of pieces (grating), the characteristic dimension of which is in the range of the wavelength of light. The incoming ray of light is divided, and its direction of propagation is changed. The new directions of the rays of light, both for the reflected and the transmitted rays, can be expressed by means of the wavelength, its integer orders and the characteristic dimension of the piece participating in the diffraction. Formulas (1) and (2) can be applied in the calculation of direction angles corresponding to the orders of the propagation directions of the diffracted light. For transmitted orders we have:

$$\sin\beta_{pT} = \frac{p\lambda}{n_2 d} + \frac{n_1}{n_2}\sin\alpha \qquad (1)$$

and for the reflected:

$$\sin\beta_{pR} = \frac{p\lambda}{n_2 d} + \sin\alpha \qquad (2)$$

where α is the angle of direction of the incoming ray of light in relation to the normal of the surface, $\beta_{pT}$ is the angle of direction of the order p of the conducted light, and $\beta_{pR}$ is the angle of direction of the order p of the reflected light, p is the order of the ray of light, 1 is the wavelength of the primary, incoming light, $n_1$ is the optical refractive index of the diffractive light pipe, $n_2$ is the refractive index of the medium surrounding the light pipe, and b is the period of the diffractive structure.

An embodiment of the invention is described here as an example. A prototype is made of the light pipe, with the purpose of illuminating a flat-panel display. Three sources of light are used, the wavelength of the transmitted light being 570 nm. The optimal diffractive structure of the light pipe is implemented with the parameters of the table below.

| Quantity | Value |
|---|---|
| Period length | 2.5396 μm |
| Groove depth | 0.5311 μm |
| Fill ratio c/d | 0.2-0.5 |

The period length of the diffractive profile is preferably designed between 1.5 μm-3.5 μm. A suitable depth of the grooves in a diffractive structure according to a preferred embodiment of the invention is from 0.3 to 0.7 μm, i.e. in the range of the wavelength, when visible light is used. On the basis of this, it will be clear to a person skilled in the art that by using suitable materials, a technique according to the preferred embodiments of the invention can also be scaled to other electromagnetic wave movements, the wavelength of which differs from that of visible light, such as applications and problems related to medical and/or technical X-raying and/or analysis methods.

By means of the preferred embodiments of the invention, the outcoupling efficiency of the diffraction surface of the light pipe can be increased as a function of the distance measured from the light source to compensate for the reduction of the amount of light used for illumination when moving away from the light source. When the outcoupling efficiency is increased at the same rate as the amount of light available decreases, an uniform brightness of the display is achieved.

The local outcoupling efficiency of the surface of a light pipe according to a preferred embodiment of the invention can be regulated by changing the period of the diffraction profile and/or the depth of the grooves. The order of the mode of scattering and the scattering angle of the outcoupling rays of light can also be regulated by changing the period of the diffraction profile. The dependence of the illumination on the angle of incidence of the ray of light is stronger at the source end of the light pipe than at the opposite end. The distribution of the illumination observed on the surface of the light pipe can be equalized by changing the period of the profile of the diffraction structure.

In addition, the diffraction profiles and/or even whole pixels can be modified suitably by turning them in relation to three possible degrees of freedom, and/or by tilting the diffraction profile or its elements, elongated surface formations and/or their local formations. Within an individual pixel, the different parts of the diffraction profile can be turned in relation to straight lines parallel with the surface to an angle suitable for the application (FIG. 10B). Even whole pixels can be deflected in angles which differ from the level of the surface of the display (FIG. 10A). The diffraction structure and/or grouping of the light pipe and/or the pixels, grooves and/or ridges contained thereby can also be designed according to fractal geometry.

A surface according to a preferred embodiment of the invention in a diffractive light pipe can be manufactured directly on the surface by using nanolitographic methods with an electron beam, for instance, or by molding the light pipe A preferable material for manufacturing the light pipe is polymethyl-methacrylate PMMA. An advantage of the invention is that a light pipe according to it can be manufactured by mass production means and methods based on extrusion, for instance. A further advantage of the invention is that its elaboration for the application can be carried out quickly by constructing a diffractive structure on a selected substrate, whereby the diffractive structure is also indiscernible for the user.

It is also possible to use more complicated profiles than those of the described embodiments of the invention (FIGS. 8 to 10) for uniform distribution of light, but when the structure becomes more complicated, the manufacturing costs are also likely to increase. Complicated techniques are described at least in the publications by Noponen et al (1992): 'Synthetic diffractive optics in the resonance domain', J. Opt. Soc. Am. A9 1206-1213. and Vasara et al (1992): Applied Optics 31, 3320-3336.

The diffractive structure on the surface of the light pipe can be made either on one side of the light pipe section or on both sides thereof. Diffraction surfaces made on both sides need not be identical. The invention is especially suitable for use in connection with a light emitting diode (LED), for example. The invention is also very suitable for use with a technique based on liquid crystal displays (LCD), for instance.

It is advantageous if all energy from the light source can be converted into the lighting of the background of the display. That requirement is met most advantageously with regard to the application of preferred embodiments of the invention when a LED is used as the light source, but also other light-sources such as lasers and/or white light sources can be used. It is known for a person skilled in the art that the light can be filtered and/or polarized. It is also known for a person skilled in the art that use of combined techniques of white light as filtered and/or polarized can be used, including combinations thereof, in which structures that store light energy are used, in other words, solutions based on phosphorescence and/or fluorescence. In order to minimize the amount of light outcoupled from the sides and ends of the light pipe section, the edges of the light pipe section can also be coated with clear and/or diffuse films or treated with a grinding suitable for the purpose.

In order to make the propagation time of the ray of light in the light pipe section as long as possible, (that is, to maximize the amount of light that is outcoupled for effective use), the light pipe section can be shaped as an asymmetric trapezium or the like, whereby the energy of the rays of light propagating in the direction of the diffractive surface and being thus otherwise led out from the ends can be utilized for lighting.

Uniform distribution of light at the first end of the light pipe can be influenced by pixelization of the diffraction structure (FIG. 9). A special portion 902 can be made at the source end of the light pipe, with the purpose of equalizing the distribution of the light from the light source (FIG. 9A).

The distribution of light based on diffraction in an appropriate pixel 902 (FIG. 9) will be demonstrated in the following example. When diffraction of light is discussed in this connection, the directions of the intensity maximums mean the propagation directions of the diffracted rays of light, in which light can be seen as a result of diffraction. When the period length of a grating in the diffraction structure is 2.5 μm, the depth of the grooves 0.5 μm, the fill factor 0.5 and the wavelength of incoming light is 470 nm with an angle of incidence $\alpha=60°$, intensity maximums are seen in directions that differ from the direction of the 0th order of the transmitted principal ray, which are 8.2°, 16.1°, 23.5° for the corresponding orders ±1, ±2 and ±3, respectively. The deviations from the principal ray of the same orders with the wavelength 570 nm are ±10°, ±19.3 and ±27.8, respectively. When the angle of incidence of the principal ray increases, the diffraction angles corresponding to the intensity maximums decrease to some extent. For example, when the wavelength is 470 nm but the angle of incidence is 80°, a ray of light of the 1st order is seen in the direction 7.3°. In addition, the distribution of the light energy between rays of light representing different diffraction orders depends strongly on the angle of incidence of the principal ray.

What is claimed is:

1. A light pipe comprising a light input end and a diffractive grating structure including elongated curved formations having diffractive properties for coupling light out from the light pipe to provide uniform backlighting of a flat-panel display, wherein the curvature is dependent on the location of a light source at the light input end.

2. A light pipe as claimed in claim 1, wherein the elongated formations are curved such that the midpoint of the curvature is defined by the location of the light source.

3. A light pipe as claimed in claim 2, wherein the midpoint of the curvature is defined by the geometrical midpoint of the dimensions of the light source.

4. A light pipe as claimed in claim 1, wherein the curved elongated formations comprise grooves.

5. A light pipe as claimed in claim 1, wherein at least a property of the curved elongated formations depends on distance from the light source.

6. A light pipe as claimed in claim 5, wherein the at least one property is at least any one of shape, profile, size, fill factor, width, and height of the curved elongated formations.

7. A light pipe as claimed in claim 1, wherein the curved elongated formations are manufactured directly into a surface of the light pipe.

8. A light pipe as claimed in claim 1, wherein the curved elongated formations comprise at least one of a binary profile, a sinusoidal wave profile, a rectangular wave profile and a triangular profile.

9. A light pipe as claimed in claim 1, wherein the curved elongated formations comprise at least two basic profiles.

10. A light pipe as claimed in claim 1, wherein the curved elongated formations contain pixels.

11. A light pipe as claimed in claim 1, comprising tilted curved elongated formations.

12. A light pipe as claimed in claim 1, wherein the diffractive structure is quadrangular.

13. A light pipe as claimed in claim 1, wherein the light pipe is shaped as an asymmetric trapezium.

14. A light pipe as claimed in claim 1, wherein the flat panel display comprises a liquid crystal display.

15. A display arrangement comprising at least one light source, a flat panel display and a light pipe, the light pipe comprising a light input end and a diffractive grating structure including elongated curved formations having diffractive properties for coupling light out from the light pipe to provide uniform backlighting, wherein the curvature is dependent on the location of a light source at the light input end.

16. A display arrangement as claimed in claim 15, wherein the at least one light source comprises a light emitting diode.

17. A method for providing backlighting of a flat-panel display, the method comprising inputting light at an input end of a light pipe into a diffractive grating structure provided with diffractive properties and coupling light out from curved elongated formations of the diffractive grating structure to provide uniform backlighting, the curvature of the elongated formations being dependent on the location of a light source at the light input end.

18. A method as claimed in claim 17, wherein coupling light out comprises coupling light out from curved elongated formations provided with a midpoint of curvature that is defined by the location of the light source.

* * * * *